United States Patent
Lee et al.

(10) Patent No.: US 9,542,728 B2
(45) Date of Patent: Jan. 10, 2017

(54) APPARATUS AND METHOD FOR PROCESSING COLOR IMAGE USING DEPTH IMAGE

(71) Applicant: SAMSUNG ELECTRONICS CO., LTD., Suwon-si (KR)

(72) Inventors: Hee Sae Lee, Yongin-si (KR); Sun Kwon Kim, Gunpo-si (KR); Seung Kyu Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 14/012,219

(22) Filed: Aug. 28, 2013

(65) Prior Publication Data

US 2014/0079288 A1    Mar. 20, 2014

(30) Foreign Application Priority Data

Sep. 20, 2012 (KR) .................. 10-2012-0104486

(51) Int. Cl.
| | | |
|---|---|---|
| G06K 9/00 | (2006.01) | |
| G06T 5/00 | (2006.01) | |
| G06T 7/00 | (2006.01) | |
| G06T 11/00 | (2006.01) | |
| H04N 13/00 | (2006.01) | |

(52) U.S. Cl.
CPC .................. *G06T 5/002* (2013.01); *G06T 5/00* (2013.01); *G06T 7/0081* (2013.01); *G06T 11/001* (2013.01); G06T 2207/10004 (2013.01); G06T 2207/10024 (2013.01); G06T 2207/10028 (2013.01); G06T 2207/20012 (2013.01); G06T 2207/20144 (2013.01); G06T 2207/20148 (2013.01); H04N 13/0037 (2013.01); H04N 2213/003 (2013.01)

(58) Field of Classification Search
CPC combination set(s) only.
See application file for complete search history.

(56) References Cited

U.S. PATENT DOCUMENTS

| | | | | |
|---|---|---|---|---|
| 6,252,982 | B1 * | 6/2001 | Haisma | H04N 5/262 345/422 |
| 7,551,797 | B2 * | 6/2009 | Dorrell | H04N 1/6086 348/224.1 |
| 8,830,348 | B2 * | 9/2014 | Nomura | G06K 9/00255 348/223.1 |
| 9,251,574 | B2 * | 2/2016 | Hamburg | G06T 5/009 |
| 9,288,456 | B2 * | 3/2016 | Ishii | H04N 9/646 |
| 2008/0123960 | A1 * | 5/2008 | Kim | G06K 9/38 382/173 |

(Continued)

FOREIGN PATENT DOCUMENTS

| KR | 10-2006-0062890 | 6/2006 |
|---|---|---|
| KR | 10-2007-0009899 | 1/2007 |

(Continued)

*Primary Examiner* — Alex Liew
(74) *Attorney, Agent, or Firm* — NSIP Law

(57) ABSTRACT

An image processing apparatus and method using a depth image are provided. The image processing apparatus may include a region determination unit to determine a foreground region and a background region in a color image using a depth image, and a color compensation unit to compensate a color with respect to the foreground region and the background region.

19 Claims, 15 Drawing Sheets

(56) References Cited

U.S. PATENT DOCUMENTS

| | | | |
|---|---|---|---|
| 2008/0211925 A1* | 9/2008 | Misawa | H04N 9/735 348/223.1 |
| 2008/0260245 A1* | 10/2008 | Matsumoto | H04N 1/62 382/167 |
| 2009/0127267 A1 | 5/2009 | Bhagat | |
| 2009/0285283 A1 | 11/2009 | Gao et al. | |
| 2010/0092085 A1* | 4/2010 | Marchesotti | G06T 7/0081 382/173 |
| 2011/0078653 A1 | 3/2011 | Deneau | |
| 2011/0109620 A1* | 5/2011 | Hong | H04N 13/0037 345/419 |
| 2011/0211043 A1 | 9/2011 | Benien et al. | |
| 2011/0261050 A1 | 10/2011 | Smolic et al. | |
| 2012/0076361 A1* | 3/2012 | Fujiyoshi | G06T 7/004 382/103 |
| 2012/0306904 A1* | 12/2012 | Francois | G06T 7/0081 345/589 |

FOREIGN PATENT DOCUMENTS

| | | |
|---|---|---|
| KR | 10-2008-0051015 | 6/2008 |
| KR | 10-2010-0053237 | 5/2010 |
| KR | 10-2011-0047814 | 5/2011 |
| KR | 10-2011-0054179 | 5/2011 |
| KR | 10-2011-0060763 | 6/2011 |

* cited by examiner

APPARATUS AND METHOD FOR PROCESSING COLOR IMAGE USING DEPTH IMAGE

CROSS-REFERENCE TO RELATED APPLICATIONS

This application claims the priority benefit of Korean Patent Application No. 10-2012-0104486, filed on Sep. 20, 2012, in the Korean Intellectual Property Office, the disclosure of which is incorporated herein by reference.

BACKGROUND

1. Field

One or more example embodiments of the following description relate to an image processing apparatus and method to process a color image using a depth image.

2. Description of the Related Art

Development is underway for an image processing technology for increasing image quality of a color image or enhancing quality of a color image by applying additional effects to the color image. For example, the image processing technology may increase resolution of a color image by processing a color image so that a particular object is emphasized or by removing natural phenomena that reduce the resolution of the color image.

However, some additional effects or natural phenomena vary differently depending on a distance to a camera. In addition, a region of an object included in an image may also vary in size according to the distance between the object and the camera. In this regard, since the conventional image processing technology uses only the color image, the effects according to the distance between the object and the camera or object tracking is difficult to be implemented by the conventional image processing technology.

Accordingly, there is a demand for an image processing technology that uses a depth value of the object included in the image.

SUMMARY

The foregoing and/or other aspects are achieved by providing an image processing apparatus including a region determination unit to determine a foreground region and a background region in a color image using a depth image, and a color compensation unit to compensate a color with respect to the foreground region and the background region.

The region determination unit may determine the foreground region and the background region using a depth histogram related to a depth value of the depth image.

The region determination unit may determine a region having a most approximate value to a depth value of a person in the depth image to be the foreground region when the person is included in the color image.

The region determination unit may recognize a face of a person included in the color image and determines a region having a most approximate value to a depth value of the face of the depth image to be the foreground region.

The color compensation unit may apply histogram equalization and white balance adjustment to the foreground region and the background region.

The color compensation unit may not apply histogram equalization to the foreground region but apply histogram equalization to the background region differentially according to depth values of the background region.

The color compensation unit may compensate for color distortion of the background region using white balance extracted from the foreground region to which histogram equalization is not applied.

The color compensation unit may compensate the color by applying at least one of contrast, saturation, and hue differently to the foreground region and the background region.

The color compensation unit may increase contrast of the foreground region while reducing contrast of the background region.

The color compensation unit may maintain saturation of the foreground region while changing saturation of the background region.

The color compensation unit may compensate a hue of the background region with reference to a hue of the foreground region of which saturation is not changed.

The foregoing and/or other aspects are also achieved by providing an image processing apparatus including an image obtaining unit to obtain a color image and a depth image, in which an object is disposed in a focus region, a boundary extraction unit to extract a boundary of the object in the depth image, and a region blur unit to blur a region excluding the boundary of the object in the color image.

The foregoing and/or other aspects are also achieved by providing an image processing apparatus including a movement information determination unit to determine movement information between depth images successively obtained for a predetermined time, a region set unit to set a region including the movement information in the color image to be a focus region, and a region blur unit to blur a region excluding the focus region in the color image.

The foregoing and/or other aspects are also achieved by providing an image processing apparatus including an object recognition unit to recognize an object included in a focus region, a region adjustment unit to adjust an object region using depth information according to movement information of the object, and a region blur unit to blur a region excluding the adjusted object region in the color image.

The foregoing and/or other aspects are also achieved by providing an image processing method including determining a foreground region and a background region in a color image using a depth image, and compensating a color with respect to the foreground region and the background region.

The foregoing and/or other aspects are also achieved by providing an image processing method including obtaining a color image and a depth image, in which an object is disposed in a focus region, extracting a boundary of the object in the depth image, and blurring a region excluding the boundary of the object in the color image.

The foregoing and/or other aspects are also achieved by providing an image processing method including determining movement information between depth images successively obtained for a predetermined time, setting a region including the movement information in the color image to be a focus region, and blurring a region excluding the focus region in the color image.

The foregoing and/or other aspects are also achieved by providing an image processing method including recognizing an object included in a focus region, adjusting an object region using depth information according to movement information of the object, and blurring a region excluding the adjusted object region in the color image.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
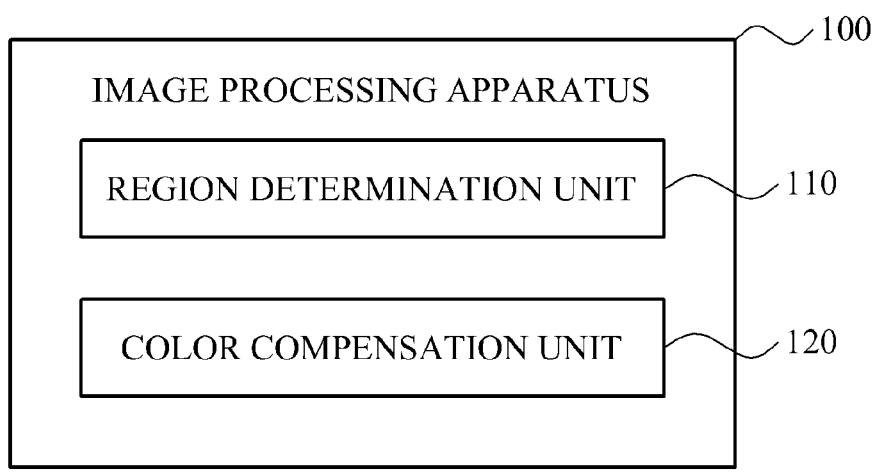
FIG. 1 illustrates an image processing apparatus according to example embodiments.

Reference will now be made in detail to example embodiments, examples of which are illustrated in the accompanying drawings, wherein like reference numerals refer to the like elements throughout.

FIG. 1 illustrates configuration of an image processing apparatus 100 according to example embodiments.

Referring to FIG. 1, the image processing apparatus 100 may include a region determination unit 110 and a color compensation unit 120.

The region determination unit 110 may determine a foreground region and a background region in a color image using a depth image by applying a depth histogram related to a depth value of the depth image.

The process of determining the foreground region and the background region by the region determination unit 110 will be described in detail with reference to FIG. 2.

When a person is included in the color image, the region determination unit 110 may determine a region having an approximate a depth value of the person in the depth image to be the foreground region. In addition, the region determination unit 110 may determine a foreground region and regions having a smaller depth value than the region having the approximate the depth value of the person of the depth image.

In addition, when a person is included in the color image, the region determination unit 110 may recognize a face of the person included in the color image. Here, the region determination unit 110 may determine a region having an approximate a depth value of the face to be the foreground region. The region determination unit 110 may determine the foreground region and regions having a smaller depth value than the region having the approximate the depth value of the face of the depth image.

The color compensation unit 120 may compensate colors of the foreground region and the background region determined by the region determination unit 110.

For this, the color compensation unit 120 may apply histogram equalization and white balance adjustment to the foreground region and the background region. In detail, the color compensation unit 120 may apply histogram equalization to a color image 310, and adjust white balance of a color image 320 to which histogram equalization is applied, thereby removing fog from the color image.

The process of applying histogram equalization and white balance adjustment to the foreground region and the background region by the color compensation unit 120 will be described in detail with reference to FIG. 3.

In addition, the color compensation unit 120 may compensate the color by applying at least one of contrast, saturation, and hue the same or differently to the foreground region and the background region. For example, the color compensation unit 120 may reduce contrast and change saturation of the background region, thereby emphasizing a subject included in the foreground region in the color image. Furthermore, the color compensation unit 120 may add a fog effect to the color image by compensating saturation and hue of the background region and adding a white value according to a distance.

The process of compensating the color by applying at least one of contrast, saturation, and hue same or differently to the foreground region and the background region will be described in detail with reference to FIGS. 4 and 5.

Figure 2:
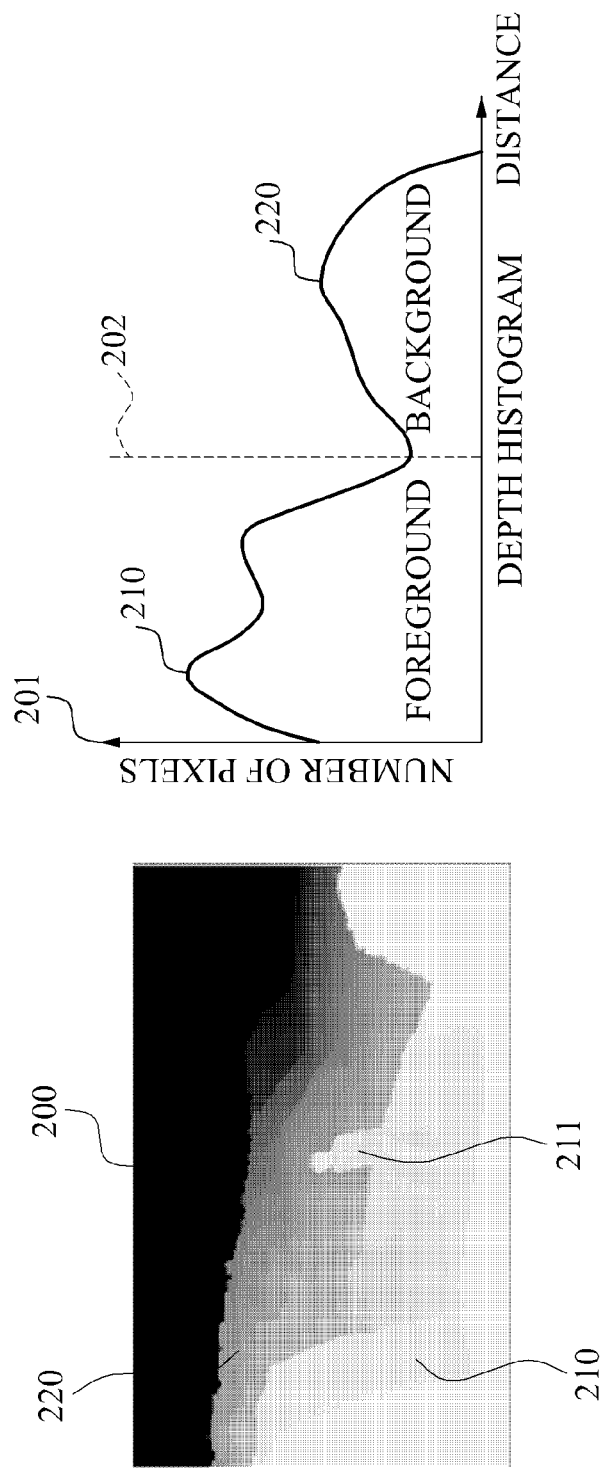
FIG. 2 illustrates a process of determining a foreground region and a background region by a region determination unit, according to example embodiments.

FIG. 2 illustrates a process of determining a foreground region 210 and a background region 220 by the region determination unit 110 according to example embodiments.

The region determination unit 110 may determine the foreground region 210 and the background region 220 using a depth histogram 201 related to a depth value of a depth image 200. Here, as shown in FIG. 2, the region determination unit 110 may determine the foreground region 210 and the background region 220 with reference to the depth value 202 having a smallest number of pixels corresponding to the depth value. Specifically, the region determination unit 110 may determine a region having a smaller depth value than the depth value 202 to be the foreground region 210 and determine a region having a larger depth value than the depth value 202 as the background region 220.

When a person is included in the depth image 200, the region determination unit 110 may recognize a face of the person included in the depth image 200. Here, the region determination unit 110 may determine a region having an approximate a depth value of the face in the depth image to be the foreground region.

In addition, when a person 211 is included in the color image, the region determination unit 110 may recognize a depth value of the person 211 in the depth image. Here, the region determination unit 110 may determine at least one region having a depth value similar to the depth value of the person 211 and regions having a smaller depth value than the at least one region to be the foreground region 210.

Figure 3:
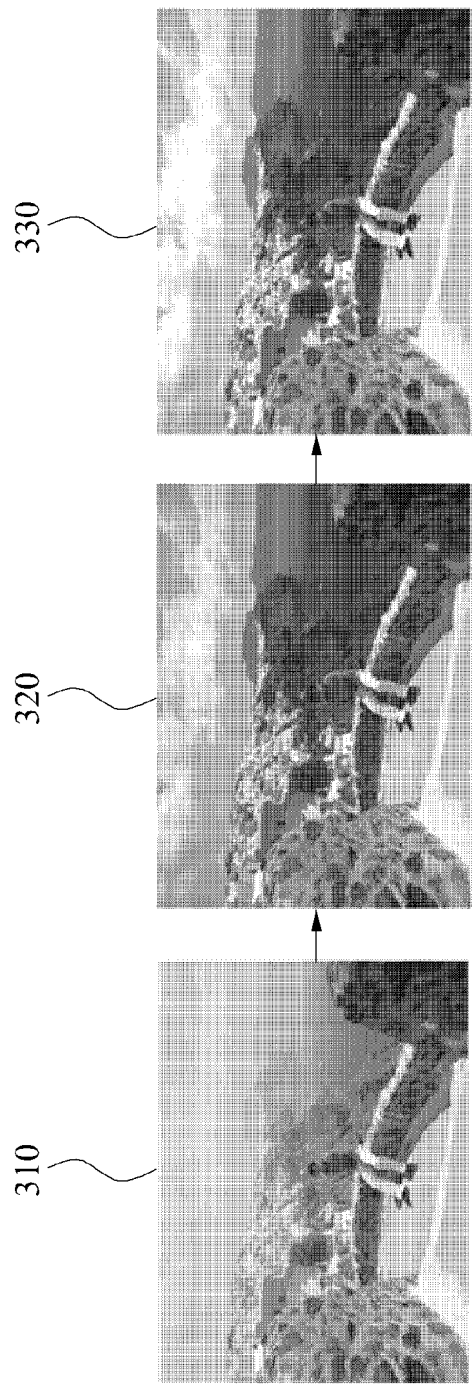
FIG. 3 illustrates a process of applying histogram equalization and white balance adjustment by a color compensation unit, according to example embodiments.

FIG. 3 illustrates a process of applying histogram equalization and white balance adjustment by the color compensation unit 120, according to example embodiments.

In the embodiments of FIG. 3, fog is removed from a color image by applying histogram equalization and white balance adjustment by the color compensation unit 120 to the foreground region and the background region.

First, the color compensation unit 120 may apply histogram equalization to the color image 310 that includes fog. Here, the color compensation unit 120 may not apply histogram equalization to the foreground region but apply histogram equalization to the background region according to a depth value of the background region. For example, the color compensation unit 120 may differentially apply histogram equalization to the background region according to a depth value of the background region.

Next, the color compensation unit 120 may output a fog-removed color image 330 by adjusting white balance of a color image 320 to which histogram equalization is applied. In detail, the color compensation unit 120 may extract white balance from the foreground region to which histogram equalization is not applied. Next, the color compensation unit 120 may apply histogram equalization using the extracted white balance, thereby compensating for a distorted color of the background region.

Figure 4:
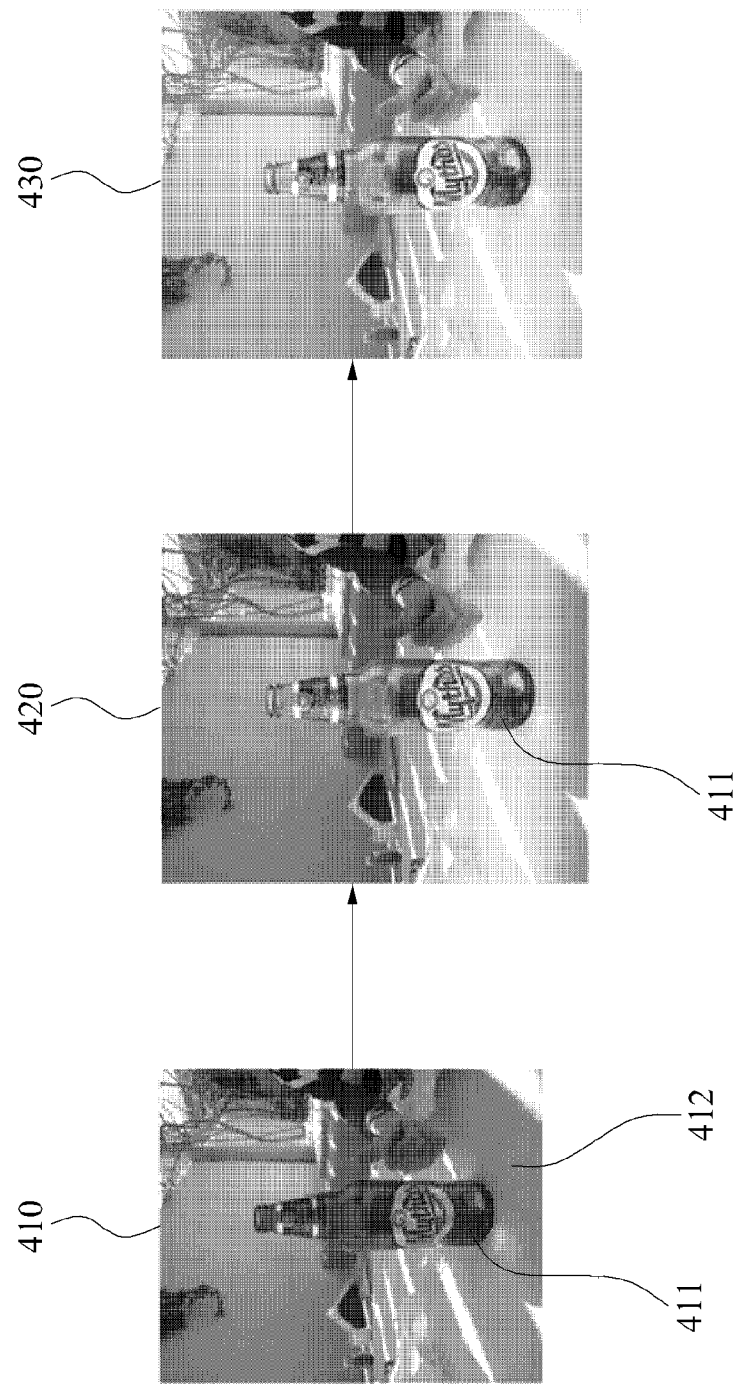
FIG. 4 illustrates a process of applying contrast and saturation differently to a foreground region and a background region by a color compensation unit, according to example embodiments.

FIG. 4 illustrates a process of applying contrast and saturation differently to a foreground region 411 and a background region 412 by the color compensation unit 120, according to example embodiments.

In the embodiments of FIG. 4, the color compensation unit 120 emphasizes a subject of a color image by applying contrast and saturation differently to the foreground region 411 and the background region 412.

First, the color compensation unit 120 may compensate contrast of a foreground region 411 and a background region 412 of a color image 410 in the same or different manners. Specifically, the color compensation unit 120 may increase contrast of the foreground region 411 and reduce contrast of the background region 412.

Next, the color compensation unit 120 may output an image 430 of which the subject included in the foreground region 411 is emphasized, by compensating saturation of the foreground region 411 and the background region 412 in different manners. That is, the color compensation unit 120 may maintain saturation of the foreground region 411 and change saturation of the background region 412. Here, the color compensation unit 120 may emphasize the subject included in the foreground region 411 by reducing saturation of the background region 412.

Figure 5:
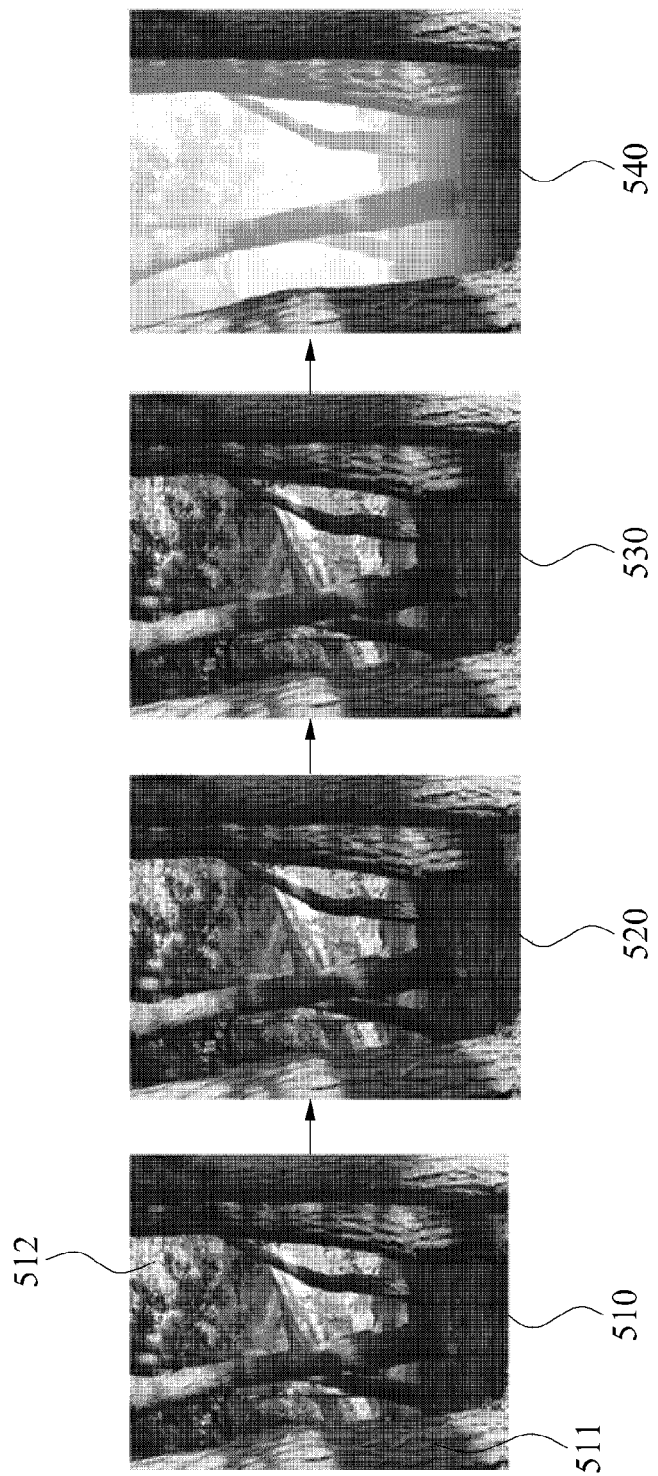
FIG. 5 illustrates a process of applying saturation and hue differently to a foreground region and a background region by a color compensation unit, according to example embodiments.

FIG. 5 illustrates a process of applying saturation and hue differently to a foreground region and a background region by the color compensation unit 120, according to example embodiments.

In the embodiments of FIG. 5, the color compensation unit 120 adds a fog effect to a color image by applying saturation and hue differently to the foreground region and the background region.

First, the color compensation unit 120 may adjust saturation of individual regions included in a color image 510 according to depth values of the individual regions. In detail, the color compensation unit 120 may maintain saturation of the foreground region and adjust saturation of only the background region by changing a color value of the background region.

In addition, the color compensation unit 120 may adjust hue of individual regions included in a saturation-adjusted color image 520. Specifically, the color compensation unit 120 may compensate hue of the background region with reference to hue of the foreground region of which saturation is not changed.

Last, the color compensation unit 120 may add white values to individual regions included in a hue-compensated color image 530, respectively, according to depth values of the individual regions, thereby outputting a color image 540 to which the fog effect is added. For example, the color compensation unit 120 may not add the white value to the foreground region but add the white value to the background region in the hue-compensated color image 530. In addition, as the depth value is smaller in the hue-compensated color image 530, the color compensation unit 120 may add a smaller white value. Here, in the background region of the hue-compensated color image 530, a region in which a distance to a camera is relatively short is slightly blurred by fog while a region in which the distance to the camera is relatively long is strongly blurred by the fog. As a result, the color image 530 may look as if being in real fog.

Figure 6:
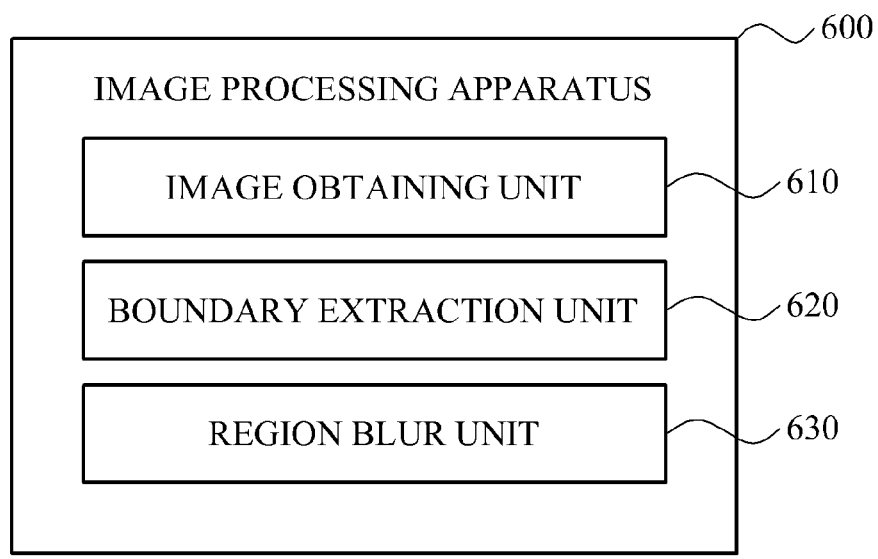
FIG. 6 illustrates configuration of an image processing apparatus according to example embodiments.

FIG. 6 illustrates configuration of an image processing apparatus 600 according to example embodiments.

When a color image and a depth image are taken by a camera such that an object is disposed in a focus region, the image processing apparatus 600 of FIG. 6 may recognize a boundary of an object with respect to other regions using a depth value of the object included in the focus region. Also, the image processing apparatus 600 may adjust the focus on the object by blurring regions excluding the object in the color image. Here, the focus region may be an auto focus designation region.

Referring to FIG. 6, the image processing apparatus 600 may include an image obtaining unit 610, a boundary extraction unit 620, and a region blur unit 630.

The image obtaining unit 610 may obtain a color image and a depth image, in which an object is disposed in a focus region. For example, the camera may take the color image and the depth image such that the object is disposed in the focus region. The image obtaining unit 610 may receive the color image in which the object is disposed in the focus region and the depth image from the camera. The color image and the depth image may include a part of the object.

The boundary extraction unit 620 may extract a boundary of the object from the depth image obtained by the image obtaining unit 610. In detail, the boundary extraction unit 620 may extract a boundary of the object with respect to other regions using a depth image of the object disposed in the focus region.

Additionally, when the image obtaining unit 610 obtains the color image and the depth image in which a part of the object is disposed in the focus region, the boundary extraction unit 620 may extract the boundary of an entire part of the object partially disposed in the focus region with respect to other regions.

The region blur unit 630 may blur a region excluding the boundary of the object, extracted by the boundary extraction unit 620, in the color image. In detail, the region blur unit 630 may blur the region excluding the object in the color image.

Figure 7:
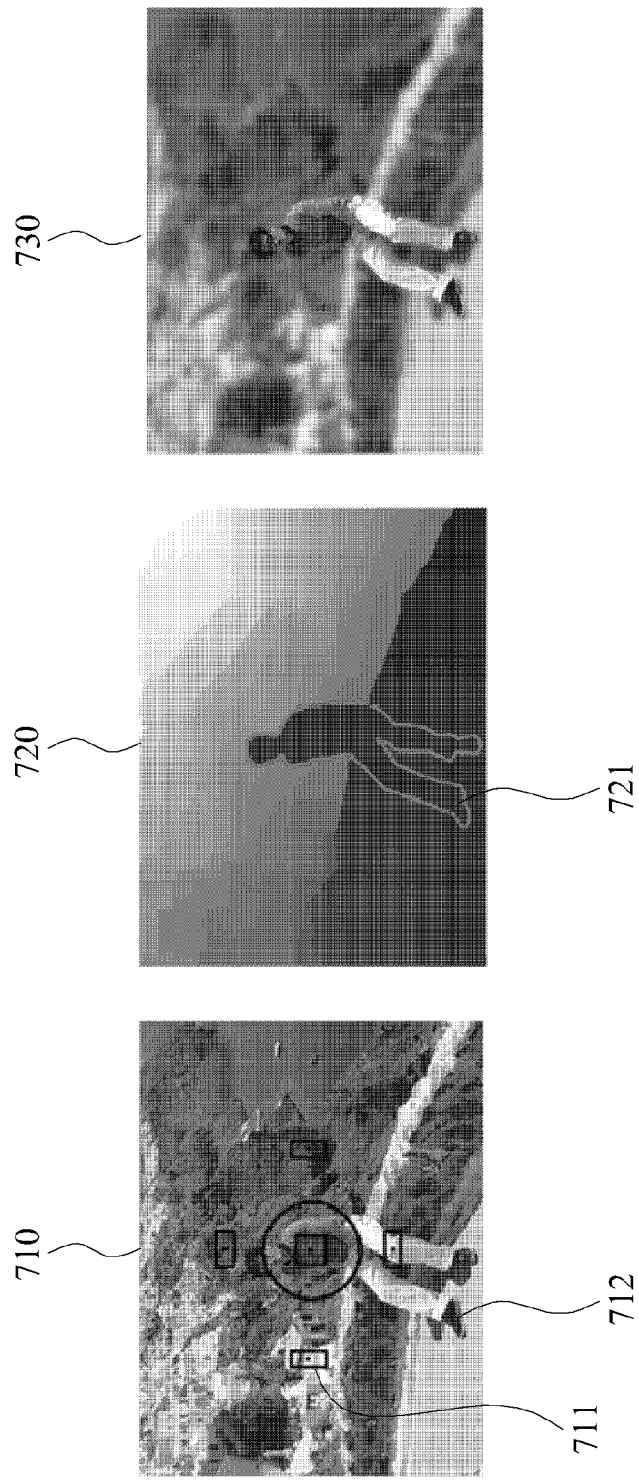
FIG. 7 illustrates a process of blurring a region excluding an object using a focus region by an image processing apparatus, according to example embodiments.

FIG. 7 illustrates a process of blurring a region excluding an object using a focus region by an image processing apparatus, according to example embodiments.

In the embodiments of FIG. 7, the image processing apparatus 600 may adjust the focus on the object by recognizing a region of the object disposed in the focus region in the color image and blurring the region excluding the object.

First, the image obtaining unit 610 may obtain a color image 710 and a depth image 720, in which an object 712 is disposed in a focus region 711.

Next, the boundary extraction unit 620 may extract a boundary 721 between the object 712 and other regions from the depth image 720 using a depth value of the object 712. Here, the boundary extraction unit 620 may extract a region having a most approximate depth value to the depth value of the object 712 in the focus region 711 and a region having a same depth value as the depth value of the object 712, as the boundary 721, so that a region of the object 712, disposed out of the focus region 711, is included in the boundary 721.

The region blur unit 630 may blur a region excluding the boundary 721 in the color image 710, thereby outputting a color image 730 in which the region excluding the object is blurred.

Figure 8:
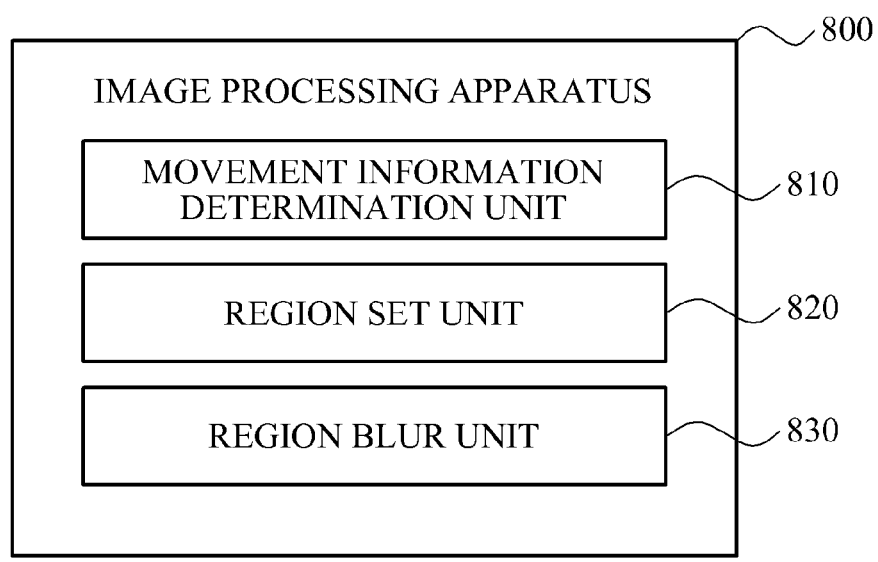
FIG. 8 illustrates configuration of an image processing apparatus according to other example embodiments.

FIG. 8 illustrates configuration of an image processing apparatus 800 according to other example embodiments.

When a camera takes a color image and a depth image successively according to a movement of an object, the image processing apparatus 800 of FIG. 8 may recognize the object using movement information between depth images. Additionally, the image processing apparatus 800 may adjust the focus on the object by blurring a region excluding the object in the color image.

Referring to FIG. 8, the image processing apparatus 800 may include a movement information determination unit 810, a region set unit 820, and a region blur unit 830.

The movement information determination unit 810 may determine movement information between the depth images successively obtained for a predetermined time. Specifically, the movement information determination unit 810 may recognize a region of which a depth value is changed, by comparing the successively obtained depth images. Here, the movement information determination unit 810 may determine the movement information using a position of regions recognized in each of the depth images and an obtainment time of the depth images. For example, a first region of which a depth value between first depth information obtained at a first time and second depth information obtained at a second time is changed may be located on a left side of the depth images. A second region of which a depth value between the second depth information and third depth information obtained at a third time, which is after a predetermined time from the second time, is changed may be located on a right side of the depth images. Here, the movement information determination unit 810 may determine movement information about a movement of the object from the left to the right in the first region and the second region. That is, a region of which movement information is determined by the movement information determination unit 810 may correspond to the object.

The region set unit 820 may set a region including the movement information in the color image to be the focus region. In detail, the region set unit 820 may recognize a region corresponding to the region, of which the depth value of the depth image is changed, in the color image and then set the recognized region to be the focus region. That is, the region set unit 820 may recognize an object moving in color images successively obtained using the depth images and set the object to be the focus region.

The region blur unit 830 may blur a region excluding the region set to be the focus region by the region set unit 820 in the color image. In detail, the region blur unit 830 may blur the region excluding the object in the color image.

Figure 9:
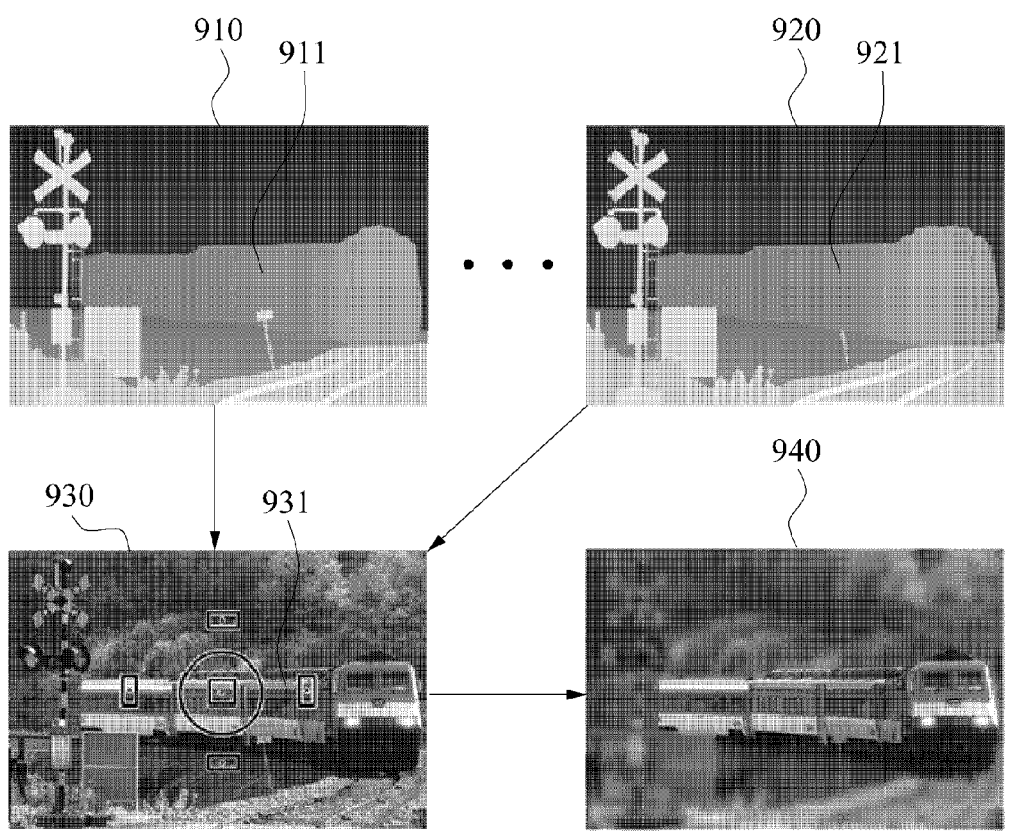
FIG. 9 illustrates a process of blurring a region excluding an object using movement information by an image processing apparatus, according to example embodiments.

FIG. 9 illustrates a process of blurring a region excluding an object using movement information by the image processing apparatus 600, according to example embodiments.

In the embodiments of FIG. 9, the image processing apparatus 600 recognizes a region of the object using the movement information between depth images successively obtained for a predetermined time, and blurs the region excluding the object, thereby adjusting the focus on the object.

First, the movement information determination unit 810 may determine movement information between the depth images successively obtained for the predetermined time.

For example, position and shape of an object 911 included in a first-obtained depth image 910 may be different from position and shape of an object 921 included in a last-obtained depth image 920. Here, the movement information determination unit 810 may determine movement information of the object 911 and the object 921.

Next, the region set unit 820 may set a region 931 including the movement information in the color image 930 to be the focus region. In detail, the region set unit 820 may recognize the region 931 corresponding to the object 911 and the object 921 in the color image 930, and set the recognized region to be the focus region.

Last, the region blur unit 630 may blur a region excluding the region 931 in the color image 930, thereby outputting a color image 940 in which a region excluding the object is blurred.

Figure 10:
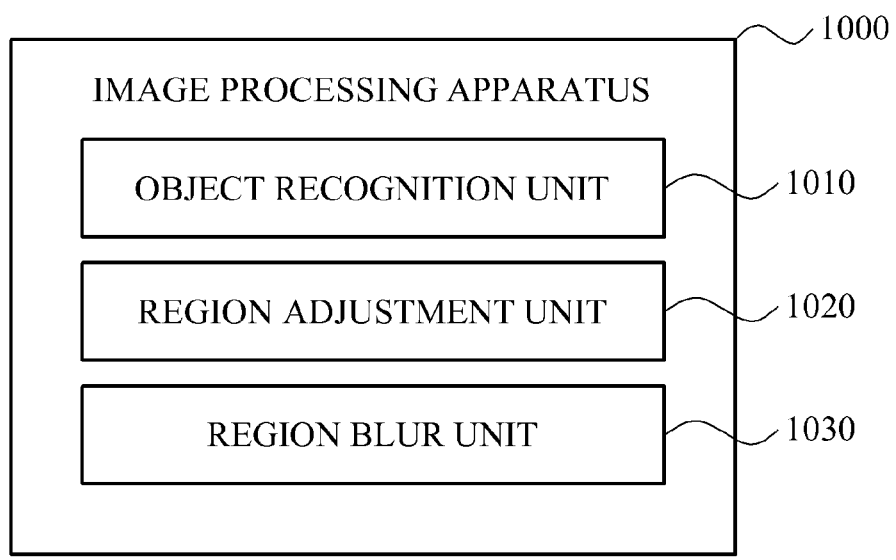
FIG. 10 illustrates configuration of an image processing apparatus according to yet other example embodiments.

FIG. 10 illustrates configuration of an image processing apparatus 1000 according to yet other example embodiments.

In the embodiments of FIG. 10, when a camera takes a color image and a depth image such that an object is disposed in a focus region, the image processing apparatus 1000 may recognize a region of the object by tracking movement information of the object using a depth information and may blur a region excluding the object, thereby adjusting the focus on the object.

Referring to FIG. 10, the image processing apparatus 1000 may include an object recognition unit 1010, a region adjustment unit 1020, and a region blur unit 1030.

The object recognition unit 1010 may recognize the object included in the focus region of the color image.

The region adjustment unit 1020 may adjust an object region using the movement information of the object recognized by the object recognition unit 1010. For example, when the object is distanced away from the camera, the depth information of the object may be increased. Here, the region adjustment unit 1020 may reduce size of the object region according to the increased depth information of the object. In addition, when the object approaches the camera, the depth information of the object may be decreased. Here, the region adjustment unit 1020 may increase size of the object region according to the increased depth information of the object.

The region blur unit 1030 may blur a region excluding the object region adjusted by the region adjustment unit 1020.

Figure 11:
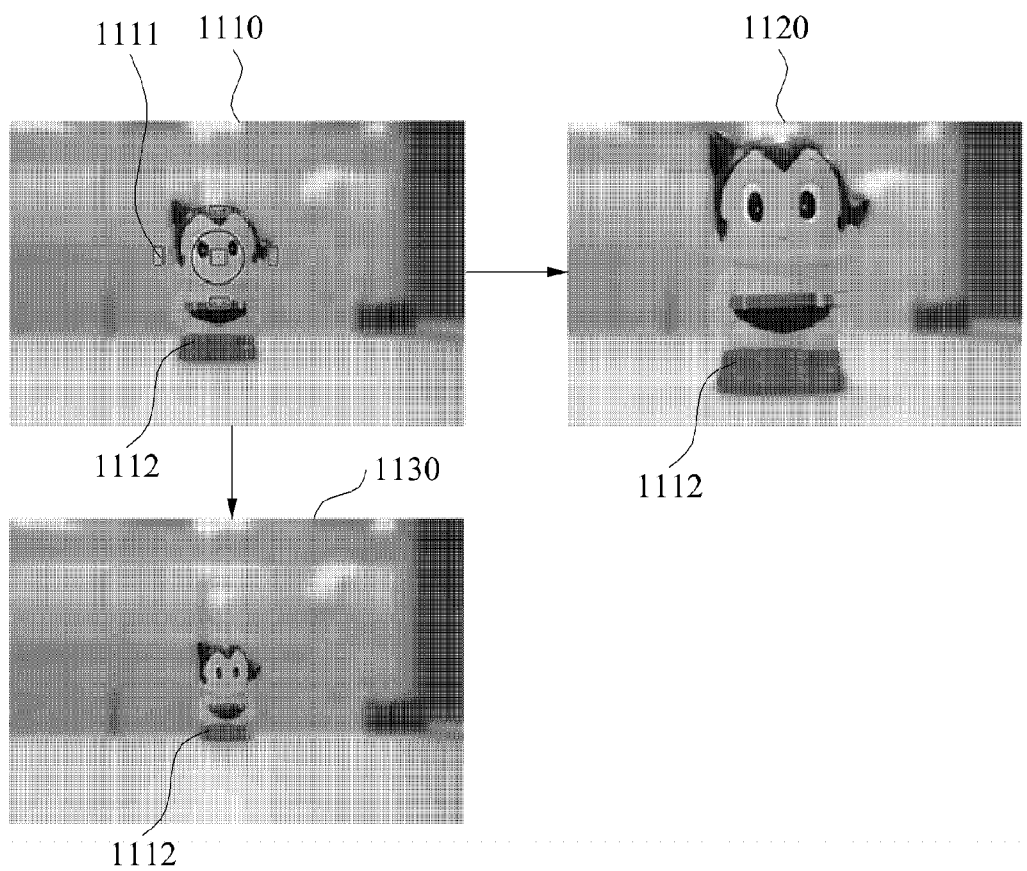
FIG. 11 illustrates a process of blurring a region excluding an object corresponding to a position change of the object, according to example embodiments.

FIG. 11 illustrates a process of blurring a region excluding an object 1112 corresponding to a position change of the object 1112 by the image processing apparatus 600, according to example embodiments.

In the embodiments of FIG. 11, the image processing apparatus 600 may recognize a region of the object 1112 by tracking movement information of the object 1112 using a depth image, and adjust the focus on the object 1112 by blurring a region excluding the object 1112.

First, the object recognition unit 1010 may recognize the object 1112 included in a focus region 1111 of a color image 1110.

Next, the region adjustment unit 1020 may adjust size of an object region using movement information of the object 1112.

For example, when the object 1112 approaches the camera, depth information of the object 1112 may be decreased. Here, the region adjustment unit 1020 may increase size of the object region according to the increased depth information of the object, so that the object 1112 included in a color image 1120 of the object 1112 approaching the camera corresponds to the object region.

When the object 1112 is distanced away from the camera, the depth information of the object 1112 may be increased. In this case, the region set unit 1020 may reduce the size of the object region according to the increased depth information of the object 1112, so that the object 1112 included in a color image 1130 of the object 1112 being distanced away from the camera corresponds to the object region.

Last, the region blur unit 1030 may blur a region excluding the object region adjusted by the region adjustment unit 1020 in the color image. Here, since the object region adjusted by the region adjustment unit 1020 corresponds to the size of the object 1112 changed in the color image according to the movement of the object 1112, only a region excluding the object in the color image may be blurred.

Figure 12:
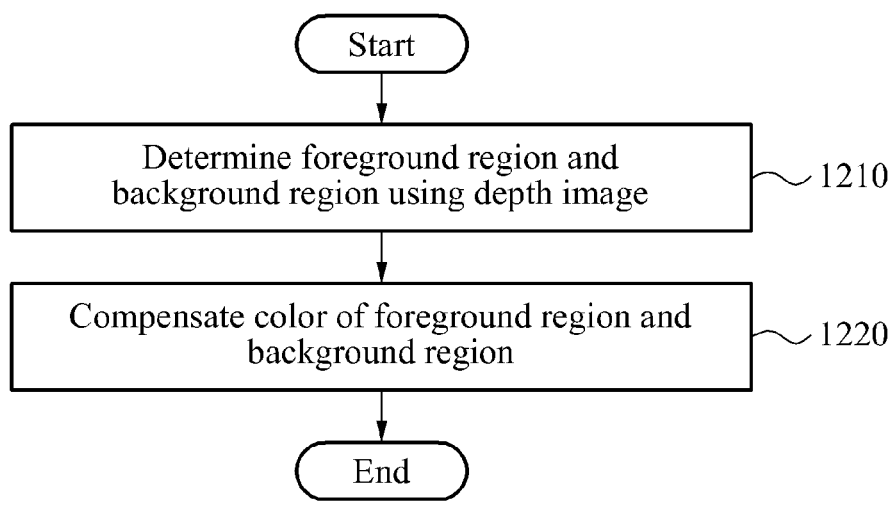
FIG. 12 illustrates an image processing method according to example embodiments.

FIG. 12 illustrates an image processing method according to example embodiments.

In operation 1210, the region determination unit 110 may determine a foreground region and a background region in a color image using a depth image. In detail, the region determination unit 110 may determine the foreground region and the background region in the color image using a depth histogram related to a depth value of the depth image.

In operation 1220, the color compensation unit 120 may compensate color with respect to the foreground region and the background region determined in operation 1210.

Here, the color compensation unit 120 may apply histogram equalization and white balance adjustment in the foreground region and the background region. In addition, the color compensation unit 120 may compensate the color by applying at least one of contrast, saturation, and hue differently to the foreground region and the background region.

Figure 13:
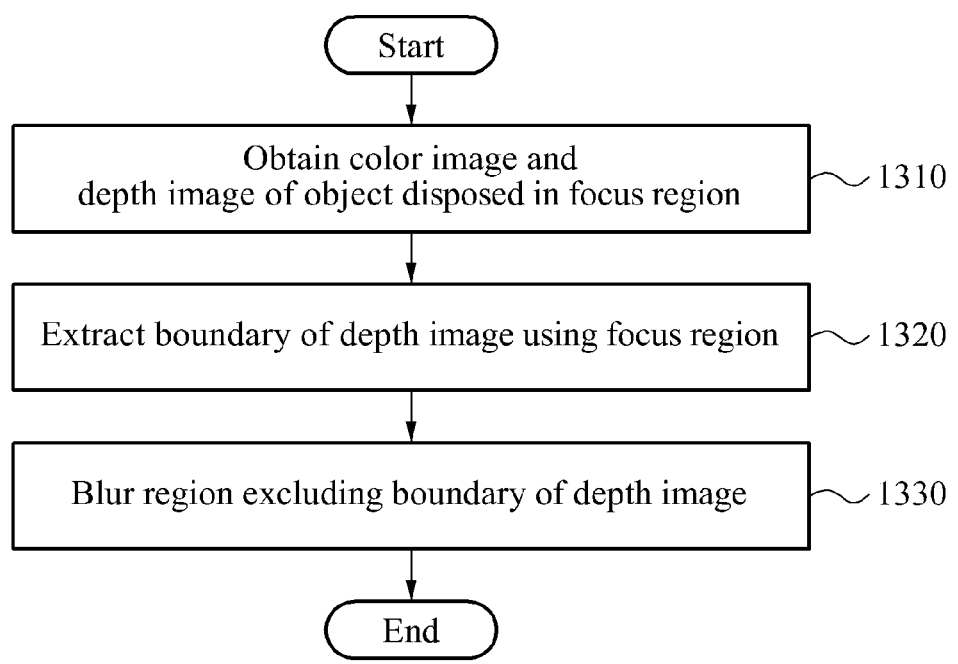
FIG. 13 illustrates an image processing method to blur a region excluding an object using a focus region, according to example embodiments.

FIG. 13 illustrates an image processing method to blur a region excluding an object using a focus region, according to example embodiments.

In operation 1310, the image obtaining unit 610 may obtain a color image and a depth image in which an object is disposed in a focus region. For example, a camera may take the color image and the depth image so that the object is disposed in the focus region. The image obtaining unit 610 may receive the color image and the depth image in which the object is disposed in the focus region from the camera.

In operation 1320, the boundary extraction unit 620 may extract a boundary of the object from the depth image obtained in operation 1310. In detail, the boundary extraction unit 620 may extract a boundary between the object and other regions using a depth value of the object disposed in the focus region.

In operation 1330, the region blur unit 630 may blur a region of the color image, excluding the boundary of the depth image extracted in operation 1320. In detail, the region blur unit 630 may blur the region excluding the object in the color image.

Figure 14:
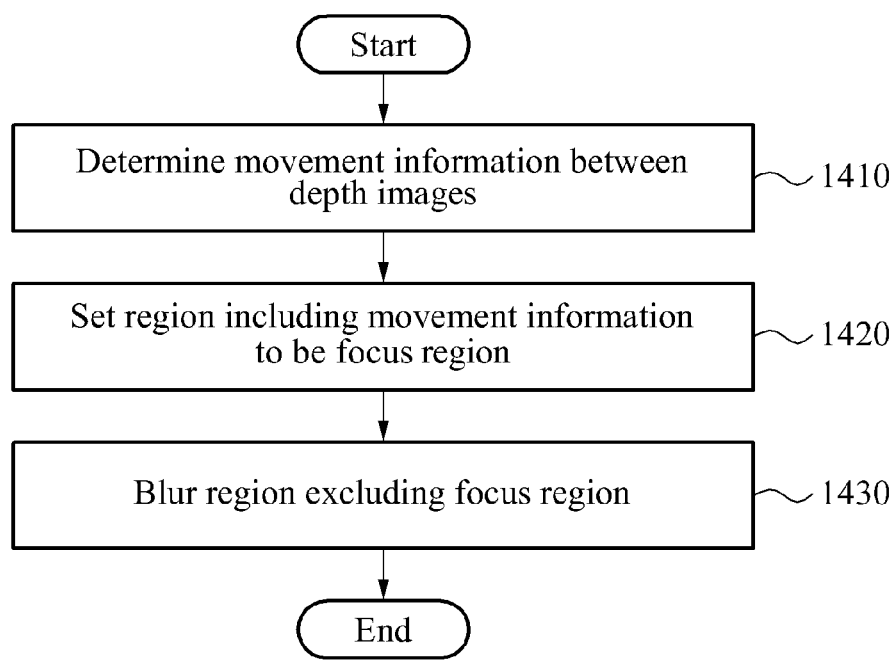
FIG. 14 illustrates an image processing method to blur a region excluding an object using movement information, according to example embodiments.

FIG. 14 illustrates an image processing method to blur a region excluding an object using movement information, according to example embodiments.

In operation 1410, the movement information determination unit 810 may determine movement information between depth images successively obtained for a predetermined time. In detail, the movement information determination unit 810 may recognize a region of which a depth value is changed, by comparing the depth images successively obtained.

In operation 1420, the region set unit 820 may set a region including the movement information determined in operation 1410 to be the focus region. In detail, the region set unit 820 may recognize a region in a color image, corresponding to a region in which a depth value of a depth image is changed, and set the recognized region to be the focus region.

In operation 1430, the region blur unit 830 may blur a region excluding the region set to be the focus region in operation 1410. In detail, the region blur unit 830 may blur a region excluding the object in the color image.

Figure 15:
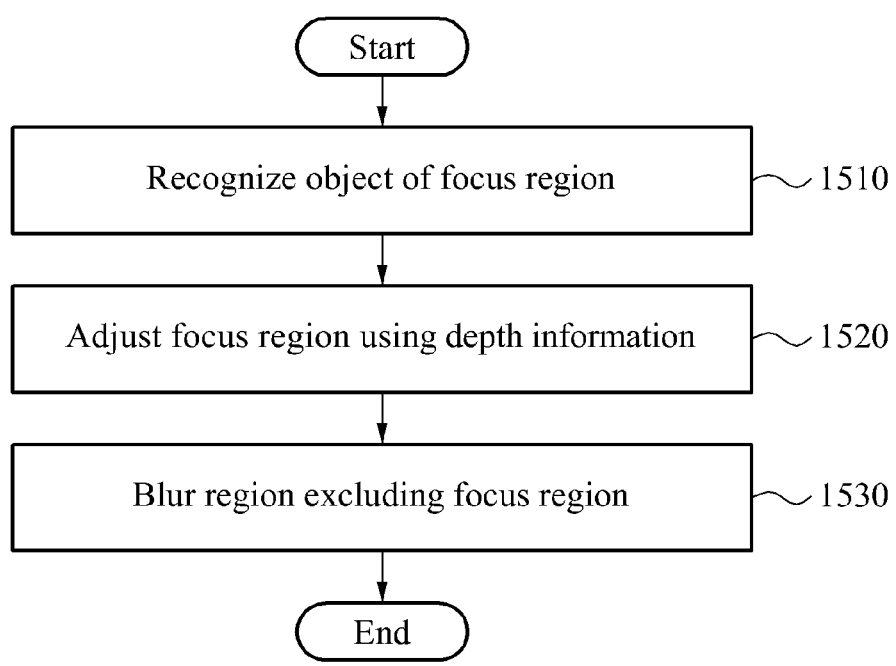
FIG. 15 illustrates an image processing method to blur a region excluding an object corresponding to a position change of the object, according to example embodiments.

FIG. 15 illustrates an image processing method to blur a region excluding an object corresponding to a position change of the object, according to example embodiments.

In operation 1510, an object recognition unit 1010 may recognize the object included in a focus region of a color image.

In operation 1520, a region adjustment unit 1020 may adjust an object region using movement information of the object recognized in operation 1510. For example, when the depth information of the object is increased according to a movement of the object, the region adjustment unit 1020 may reduce size of the object according to the increased depth information. When the depth information of the object is decreased according to a movement of the object, the region adjustment unit 1020 may increase size of the object according to the decreased depth information.

In operation 1530, the region blur unit 1030 may blur a region of the color image, excluding the object adjusted in operation 1520.

The region blur unit 1030 may blur the region excluding the object adjusted by the region adjustment unit 1020 in the color image.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. An image processing apparatus comprising:
a region determination unit to determine a foreground region and a background region in a color image using a depth image; and
a color compensation unit to compensate a color with respect to the foreground region and the background region,
wherein, in a compensating for a distorted color of the background region, the color compensation unit does not apply histogram equalization to the foreground region but applies histogram equalization to the background region, extracts white balance from the foreground region to which histogram equalization is not applied, and applies histogram equalization using the extracted white balance to compensate for the distorted color of the background region.

2. The image processing apparatus of claim 1,
wherein the region determination unit determines the foreground region and the background region using a depth histogram related to a depth value of the depth image, representing depth values of the foreground and background regions, the determination unit determining a boundary between the foreground region and the background region to occur based on a determination of where the depth histogram represents a low number of depth pixels compared to an observed distribution of depth pixels of the depth image indicating short depths and an observed distribution of depth pixels of the depth image indicating large depths.

3. The image processing apparatus of claim 1, wherein the region determination unit determines a region having an approximate depth value of a person in the depth image to be the foreground region when the person is included in the color image.

4. The image processing apparatus of claim 1, wherein the region determination unit recognizes a face of a person included in the color image and determines a region having an approximate depth value of the face of the depth image to be the foreground region.

5. The image processing apparatus of claim 1, wherein the color compensation unit applies histogram equalization and white balance adjustment to the foreground region and/or the background region.

6. The image processing apparatus of claim 1, wherein the color compensation unit compensates the color by applying at least one of contrast, saturation, and hue to the foreground region and/or the background region.

7. The image processing apparatus of claim 6, wherein the color compensation unit increases contrast of the foreground region while reducing contrast of the background region.

8. The image processing apparatus of claim 6, wherein the color compensation unit maintains saturation of the foreground region while changing saturation of the background region.

9. The image processing apparatus of claim 6, wherein the color compensation unit compensates a hue of the background region with reference to a hue of the foreground region of which saturation is not changed.

10. An image processing method comprising:
determining a foreground region and a background region in a color image using a depth image; and
compensating a color with respect to the foreground region and the background region,
wherein, in a compensating for a distorted color of the background region, the compensating of the color comprises not applying histogram equalization to the foreground region but applying histogram equalization to the background region, extracting white balance from the foreground region to which histogram equalization is not applied, and applying histogram equalization using the extracted white balance to compensate for the distorted color of the background region.

11. The image processing method of claim 10, wherein the determining comprises determining the foreground region and the background region in the color image using a depth histogram related to a depth value of the depth image.

12. The image processing method of claim 10, wherein the determining comprises determining a region having an approximate depth value of a person in the depth image to be the foreground region when the person is included in the color image.

13. The image processing method of claim 10, wherein the determining comprises recognizing a face of a person included in the color image and determining a region having an approximate depth value of the face of the depth image to be the foreground region.

14. The image processing method of claim 10, wherein the compensating of the color comprises applying histogram equalization and white balance adjustment to the foreground region and/or the background region.

15. The image processing method of claim 10, wherein the compensating of the color comprises compensating the color by applying at least one of contrast, saturation, and hue to the foreground region and/or the background region.

16. The image processing method of claim 15, wherein the compensating of the color comprises increasing contrast of the foreground region while reducing contrast of the background region.

17. The image processing method of claim 15, wherein the compensating of the color comprises maintaining saturation of the foreground region while changing saturation of the background region.

18. The image processing method of claim 15, wherein the compensating of the color comprises compensating a hue of the background region with reference to a hue of the foreground region of which saturation is not changed.

19. A non-transitory computer readable recording medium storing a program to cause a computer to implement the method of claim 10.

* * * * *